United States Patent Office 3,121,719
Patented Feb. 18, 1964

3,121,719
CERAMIDONINE VAT DYES AND PROCESS
OF PREPARING SAME
Joseph Deinet, Woodcliff Lake, N.J., assignor to E. I. du
Pont de Nemours and Company, Wilmington, Del., a
corporation of Delaware
No Drawing. Filed Nov. 23, 1960, Ser. No. 71,153
6 Claims. (Cl. 260—274)

This invention is directed to new acridine type anthraquinone vat dyes containing a special type of an acridine ring present as the ceraminonine structure. The present invention also encompasses a process of preparing the novel dyes herein described. In its simplest form, ceramidonine (also spelled coeramidonine) is the acridine derivative shown below, in which the aromatic bonds may be illustrated in two equivalent forms:

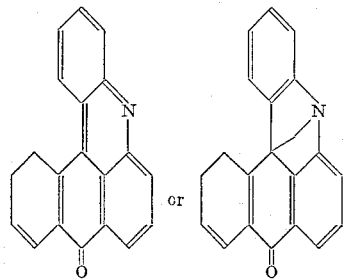

The present invention relates to brown or blackish-brown vat dyes containing the ceramidonine structure in the form of the benzanthrone-anthraquinone-acridine rings system which follows:

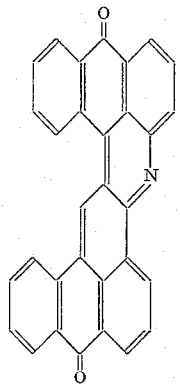

There is a long-felt and urgent need for relatively low-priced vat dyes in the dark shade range, which dyes would be useful for the dyeing of the fabric for children's and work clothing and, in general, for textiles where the sales price of the end-product must be held to a minimum, but which are very frequently laundered, thus requiring excellent bleach-fastness of the dyeing.

The best now available anthraquinone vat dyes of the desired shade range are made by subjecting the corresponding anthrimides to a ring-closure treatment which places the imide nitrogen into a heterocyclic ring, thus producing in the final dye structure the required high conjugation and excellent fastness properties. Heretofore, only two types of such heterocyclic rings have been found useful in the pertinent dyes, namely the carbazole ring and the ordinary acridine ring, such as is present in the simple acridine which is represented by the following structure:

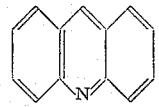

A typical example of a carbazole type vat dye is the dye first marketed in Germany as Indanthrene Brown BR, now classified as C.I. Vat Brown 1 of the C.I. 70800 formula, which is made by dehydrogenating the corresponding anthrimide by a fusion with aluminum chloride in pyridine, followed by an oxidation treatment. A typical example of an excellent acridine type vat dye is the dye represented by the original Indanthrene Olive T, now classified as C.I. Vat Black 25 of the C.I. 69525 formula, in which the acridine ring is formed by subjecting the corresponding anthrimide to a fusion with potassium hydroxide in boiling isobutyl alcohol. By this treatment two hydrogens are removed in the formation of an acridine ring, thus producing the following structure:

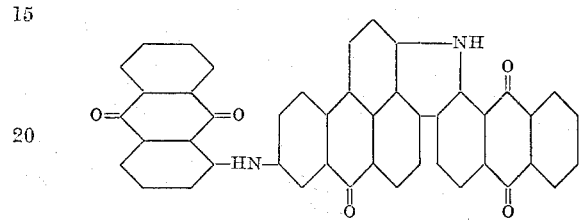

Indanthrene Olive T

These relatively expensive and hazardous ring-closure treatments according to the best known preparation methods cited in the Colour Index, contribute very significantly to the high manufacturing costs of these vat dyes.

The prior art does not disclose a simple, inexpensive treatment, such as ring-closure with sulfuric acid, for converting this anthraquinolylamino-benzanthrone type of anthrimides to useful vat dyes.

It is an object of this invention therefore to provide novel vat brown or gray dyes possessing significantly superior fastness properties comparable with those dyes heretofore attainable in this range of shades only with anthraquinone vat dyes of the carbazole and conventional acridine types.

It is a further object of this invention to utilize the tinctorially very strong chromophore represented by the ceramidonine structure in the synthesis of the herein-described novel vat dyes, said synthesis being achieved by heating a 3-(1-anthraquinonylamine)benzanthrone containing an additional anthraquinonylamino radical which is attached either to the 9-position in the benzanthrone or to one of the 4-, 5-, or 8-positions in the anthraquinone, in a dehydrating agent selected from the group consisting of 70 to 95% sulfuric acid and polyphosphoric acid, at a temperature within the range of about 50 to 155° C. until the acridine ring-closure is completed.

These and other objects will become apparent in the following description and claims.

More specifically, the present invention is directed to vat dyes of the general formula

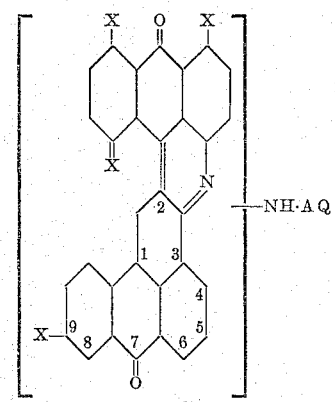

where AQ stands for an anthraquinone radical which may contain inert substituents or a ringed appendage, and in which the anthraquinonylamino radical is attached in one of the X-positions, while the remaining X's are hydrogen.

This invention is also directed to a process for preparing vat dyes containing the ceramidonine structure, which process comprises heating a solution or suspension of 3-(1-anthraquinonylamino)benzanthrone containing an additional anthraquinonylamino radical which may be suitably substituted, and which is attached either to the 9-position in the benzanthrone or to one of the 4-, 5-, or 8-positions in the anthraquinone, in a dehydrating agent selected from the group of concentrated (70–95%) sulfuric acid and polyphosphoric acid at 50–155° C. until the acridine ring-closure is completed.

It was discovered by applicant that the introduction of a suitable vattable radical into the complex ceramidonine structure shown in the heretofore-described general formula in brackets (when all X's are hydrogen) imparts to this brown pigment, which pigment does not have the required vatting properties, excellent vat solubility and good affinity of the leuco to the cellulosic fiber. It was also a quite unpredictable and very surprising discovery by applicant that dyeings produced with the vat browns or grays obtained when the remaining vattable group is an anthraquinonylamino radical (or an equivalent thereof) and is located in any of the X-positions, rank so high in respect to essential fastness properties, especially fastness to bleaching agents, that these novel dyes can replace, in important commercial uses, the now available and much more expensive carbazole and ordinary acridine type vat dyes of comparable shades.

The preferred dye of this invention is the product of Example 1 which follows and is readily made by condensing one mole of 3,9-dibromo (or dichloro)-benzanthrone with two moles of 1-aminoanthraquinone, followed by ring-closure of the anthrimide with moderately concentrated sulfuric acid at elevated temperature. As a variation of this synthesis, it is also possible to first react the 3,9-dihalogenated benzanthrone with only one mole of an alpha-aminoanthraquinone by taking advantage of the relatively higher reactivity of the halogen in the 3-position, and then reacting the remaining halogen in the 9-position with one mole of the same or of any other alpha- or any beta-aminoanthraquinone. By this two-step synthesis, a great variety of dyes within the scope of the present invention can be obtained. It is, however, essential that the imino link involved in the formation of the heterocyclic ring be derived from an alpha-aminoanthraquinone. As a further variation in the synthesis of anthrimides which are operative according to this invention, one mole of 3-bromobenzanthrone may be first condensed at a relatively low temperature with one mole of 1,5-diaminoanthraquinone, or with one mole of the technical mixture of 1,5- and 1,8-diaminoanthraquinones, followed by reacting the alpha-amino group remaining in the anthraquinonylamino radical at a relatively higher temperature with one mole of an alpha- or beta-halogenoanthraquinone. The reverse procedure, i.e., reacting 3-bromo-benzanthrone first with 1-amino-5-chloroanthraquinone, followed by reacting with an aminoanthraquinone, also may be used.

Operative anthrimides can also be prepared by first reacting 3-bromo (or chloro)-benzanthrone with an alpha:alpha-diaminoanthraquinone in which only one of the two amino groups is free to react, while the other has been temporarily inactivated by replacing its aminohydrogen with a hydrolyzable group, such as the benzoyl or acetyl radicals. Commercially available diamines of this type are 1- amino-4-benzoylaminoanthraquinone and the technical mixture of the 1-amino-5 and 8-benzoyl-aminoanthraquinones. The acylamino group remaining in the first produced 3-[1-(X-acylamino)anthraquinonyl-amino]-benzanthrone can then be hydrolyzed in the usual manner (for instance by treatment with hot sulfuric acid or caustic alkalies), and the amino-anthrimide thus obtained can be further reacted with an alpha-halogenated anthraquinone, followed by forming the ceramidonine structure by the ring-closure process according to this invention. It is obvious to those skilled in the art that this synthesis may be simplified by combining the hydrolysis of the acylamino group with the acridine ring-closure, when the concentration and temperature of the sulfuric acid are properly adjusted.

As has been specified in the preceding discussion of the present invention, either of the two anthraquinonylamino radicals in the pertinent anthrimides can carry "inert" substituents or ringed appendages. As such, only those atoms or radicals are operative and of interest, which do not increase the cost of the dyes beyond that of present standards, and which do not interfere with the success of the synthesis and ring-closure of the anthrimide, or which do not impart water-solubility or lack of essential fastness properties to the final dyes. Optional substituents or appendages must also be stable to the hydrolytic or sulfonating action of the sulfuric acid under the required ring-closure conditions. These considerations exclude, in general, ceramidonine vat dyes which contain free amino or hydroxy groups or readily hydrolyzable acylamino and alkoxy groups, as well as, of course, free sulfonic acid or carboxylic acid groups. Operative and useful equivalents according to this invention are, however, in addition to those anthrimides described in the examples, the anthrimides obtained by using in Example 1, in place of the 1-aminoanthraquinone which is involved in the acridine ring formation, technical 1-amino-2-chloroanthraquinone or 1-amino-2-methylanthraquinone. Representative alpha-aminoanthraquinones include: 1-amino-3-chloroanthraquinone (sold by Sandoz, Inc.); 1-amino-2-bromoanthraquinone (U.S. 2,650,928); 1-amino-3-bromoanthraquinone (C.I. 11750); 1-amino-4-(N-methylamino)anthraquinone (C.I. 61105); 1-amino-4-(N-cyclohexylamino)anthraquinone (C.I. 61107); 4-aminoanthraquinone-2,1(N)-benzacridone (sold by the Antara Chemicals Co.); 1-amino-2-methyl-4-(p-toluidino) anthraquinone (sold by Du Pont); and, 1-amino-2-bromo-4-(p-toluidino)anthraquinone (sold by Du Pont).

For forming the vattable group attached to the final dye, any relatively inexpensive alpha- or beta-aminoanthraquinone is operative as long as it does not contain a reactive halogen, or a substituent which would impair the fastness properties of the final dye. For instance, any of the alpha-aminoanthraquinones listed above may be used, which makes it possible to avoid a two-step condensation process when 3,9-dihalogenobenzanthrone is the other reaction partner, as is illustrated in Example 1. However, when the two-step condensation method, illustrated in Example 4, is employed, the 1-aminoanthraquinone used in the second step may be replaced by any other alpha-aminoanthraquinone selected from the above list, or by a suitable beta-aminoanthraquinone, such as 2-amino-3-chloroanthraquinone or 2-amino-3-bromoanthraquinone.

The halogenated benzanthrones which are needed for the synthesis of the useful anthrimides according to this invention are not readily available with inert substituents elsewhere in the molecule.

An illustration of the synthesis, and use according to this invention, of an anthrimide containing a ringed-appendage in the form of an acridone ring condensed to the anthraquinonylamino radical involved in the formation of the acridine ring, is described in Example 4. The other anthraquinonylamino radical can also possess a ringed-appendage. In place of the acridone ring, other inert appendages, such as carbazole, oxazole, or thiazole rings are operative. Of these heterocyclic rings, the carbazole ring is of particular interest in some dyes of this invention, because its formation can in some cases be combined with the ring-closure treatment, and because its presence is usually an asset in vat dyes of dark shades.

Most of the anthrimides to be used according to this invention, and the intermediates from which they are made are well known in the prior art and commonly available in a technical quality which is satisfactory for this purpose. The original literature references disclosing the preparation of those aminoanthraquinones which are listed above with C.I. numbers, are cited in the Colour Index, vol. 3, under these entries. Those which are indicated to be sold by American firms, are listed in the 1960 edition of "Chem. Sources," published by the Directories Publishing Company, New York.

The ring-closure conditions which are required to produce the dyes of this invention, are, in general, similar to those disclosed in the prior art for preparing ceramidonine type acridines from other suitable anthrimides or aryliminoanthraquinones. Heretofore, this dehydration reaction was usually carried out by heating the anthrimide in sulfuric acid under the controlled concentration and temperature conditions discussed below. It was discovered that polyphosphoric acid also is a useful dehydrating agent for the ring-closure according to this invention. Polyphosphoric acid is a commercial product made by adding phosphorus pentoxide to anhydrous phosphoric acid. When using sulfuric acid, its concentration and the temperature must be so chosen that, on the one hand, its dehydration effect is sufficiently strong to split out one mole of water derived from the keto-oxygen of the anthraquinone, the imino hydrogen, and the hydrogen located in the 2-position of the benzanthrone. On the other hand, the acid concentration and temperature must be kept below that causing sulfonation of any of the aromatic rings. Operative and permissible acid concentration and temperature are, therefore, dependent upon each other. When, for instance, the selected sulfuric acid concentration is as high as about 95%, the temperature must be kept as low as 50–60° C. to avoid sulfonation. If, as the other extreme, the selected sulfuric acid concentration is as low as about 70%, the temperature must be raised to as high as about 150° C. to complete the dehydration reaction. A preferred and safe procedure is to adjust the ring-closure conditions within a medium range between the two extremes indicated above. For the anthrimides defined according to this invention the preferred ring-closure conditions are to use sulfuric acid of 88–92% $H_2SO_4$ and a temperature of 85–110° C., or polyphosphoric acid at 145–155° C.

The amount of sulfuric or polyphosphoric acids to be used is not critical, as long as it is sufficiently large to produce an easily stirred solution or suspension of the anthrimide and ceramidonine derivative throughout the ring-closure treatment, and as long as the water formed during the dehydration reaction does not lower the acid concentration to a degree which would render it ineffective as a dehydrating agent at the selected maximum temperature. A minimum of 5, but preferably about 10 parts by weight of sulfuric or polyphosphoric acid per part of the dry anthrimide to be ring-closed is the preferred amount; much more acid can be employed, but this is unnecessary and is wasteful. The use of sulfuric acid is under present market conditions much preferred to that of the polyphosphoric acid, because the latter is considerably higher priced.

All the other steps involved in the preparation and purification of the new vat dyes according to this invention, including their isolation from the ring-closure solution, and, if desired, the brightening of the dyeing shade by subjecting the crude dye to a treatment with bichromate or hypochlorite in acid or alkali, respectively, are processes which are well known to those skilled in the prior art. They are illustrated in the following examples which describe preferred embodiments of this invention, but are not intended to limit its scope except as defined in the broadest claims.

Representative examples illustrating the present invention are as follows.

Example 1

One part of 3,9-bis-(1-anthraquinonylamino)benzanthrone (prepared as disclosed in the Colour Index for the dye of C.I. 69525) is introduced into 10 parts of 88% sulfuric acid while stirring. The stirring is continued while the mixture is heated to 90° C. and then kept for three hours at 90–95° C. During this time the color changes from an olive-green to red. The reaction mass is then cooled and poured into 80 parts of water. The dye is filtered off and the cake is washed with water until it is free of acid. It dyes cotton in attractive brown shades from a reddish-brown vat. The fastness properties of the dyeings, especially bleach-fastness, are very much superior to those of any known sulfur brown; they approach closely those of the best known anthraquinone vat browns.

The structure of this dye product may be represented by the following formula:

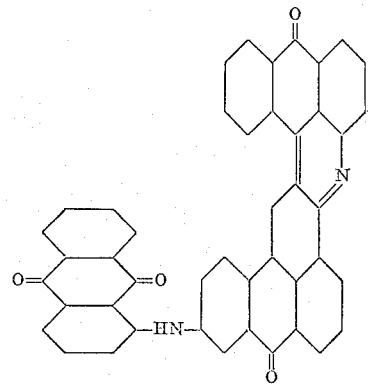

The C.I. 69525 dye (Indanthrene Olive T) which is obtained from the same anthrimide by ring-closure with alcoholic potassium hydroxide, dissolves in concentrated sulfuric acid solution with a green color and gives a gray-colored vat from which cotton is dyed in an olive-green shade. The Colour Index discloses for this old (1929) dye the following, conventional acridine type structure:

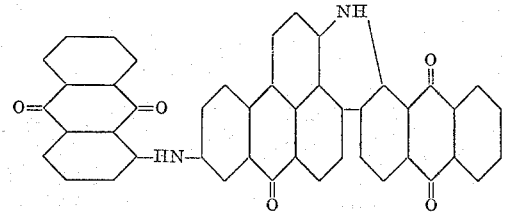

Example 2

Somewhat brighter shades of brown are obtained when the diluted reaction mass described in Example 1 is treated with an oxidizing agent. This treatment is carried out by adding, after pouring the reaction mass into water, 0.1 part of sodium bichromate and heating with stirring at 75–80° C. for one hour. The dye is then filtered off and the cake is washed with water until it is free of acid.

Example 3

Forty parts of 1-(3-methyl-2-anthraquinonylamino)-5-(3-benzanthronylamino)anthraquinone of the structure shown below, which is made by condensing 3-bromobenzanthrone with one mole of 1,5-diaminoanthraquinone, followed by further condensation with one mole of 2-bromo-3-methylanthraquinone, as described in Example 1 of U.S. 2,505,234, is added to 4000 parts of 88% sulfuric acid while stirring. The mixture is heated to 90–95° C. and held at this temperature until the color of the mass changes from a reddish-blue to a dull green. After cooling to room temperature, the reaction mass is poured into 2000 parts of water. Four parts of sodium bichromate is added, and the stirred slurry is heated to 75–80° C. and held at this temperature for one hour. The slurry is then cooled and diluted to 3500 parts with water, and the dye isolated by filtration. The product dyes cotton from a brown vat in bluish-brown shades.

The anthrimide used in this example has the following structure:

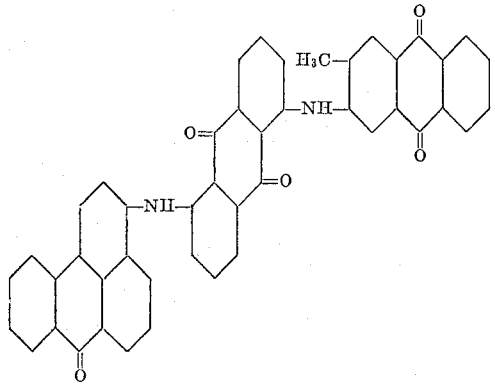

The dye, when ring-closed by this treatment with 88% sulfuric acid, may be represented by the following formula:

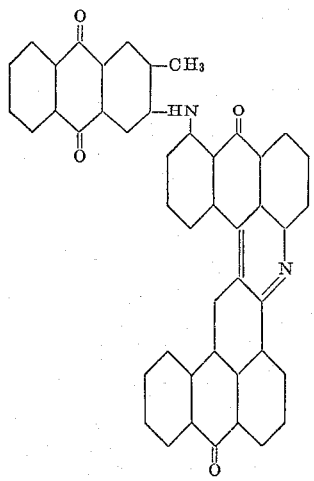

In contrast to this new dye, the diacridine type dye which is made from the same anthrimide by an alcoholic caustic fusion according to the process described in Example 1 of the patent cited above, dissolves in concentrated sulfuric acid with a bright olive-green color, and it dyes cotton from a dull violet-brown vat in gray shades.

*Example 4*

The anthrimide used for preparing the dye of this example is obtained by first heating 3,9-dibromobenzanthrone with one mole of 8-aminoanthraquinone-2,1(N)-benzacridone in nitrobenzene in the presence of an acid binder and a copper catalyst at 170–175° C. until the reaction of the bromine in the 3-position of the benzanthrone with the 8-amino group of the benzacridone is completed, and then adding one mole of 1-aminoanthraquinone and an additional amount of the acid binder and copper catalyst and heating the mass at about 200° C. until the bromine in the 9-position of the benzanthrone is completely reacted with the amino group. Thirty-five parts of this isolated anthrimide is introduced while stirring into 350 parts of 88% sulfuric acid, and the suspension is heated to 90–95° C. After stirring for 3 hours at this temperature, the mass is poured into 2500 parts of water. Five parts of sodium bichromate is then added, and the slurry is heated to 75° C. After holding the temperature at 75–80° C. for one hour, the dye is filtered off and the cake is washed with water. It forms a brown vat from which cellulosic fibers are dyed in blackish-brown shades. The dye product obtained may be represented by the following formula:

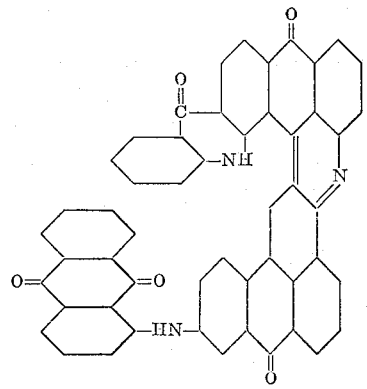

*Example 5*

To 10 parts of 89% sulfuric acid is added 1.0 part of 1-(3-benzanthronylamino)-5 and 8-(1-anthraquinonylamino)-anthraquinone, made by condensing one mole of the technical mixture of 1,5- and 1,8-diaminoanthraquinone, first with one mole of 3-bromobenzanthrone, and then with one mole of 1-chloroanthraquinone. This two-step synthesis of the anthrimide is carried out in a manner similar to that described in the previous example. While stirring, the suspension is heated to 90–95 C. and held at this temperature until the color changes from gray to maroon. The reaction mass is then poured into 80 parts of water, and the slurry is then treated with sodium bichromate in the manner described in Example 2. The resulting dye gives a brown vat from which cotton is dyed in brownish-gray shades. The product obtained is considered to be the mixture of isomeric dyes represented by the following formula:

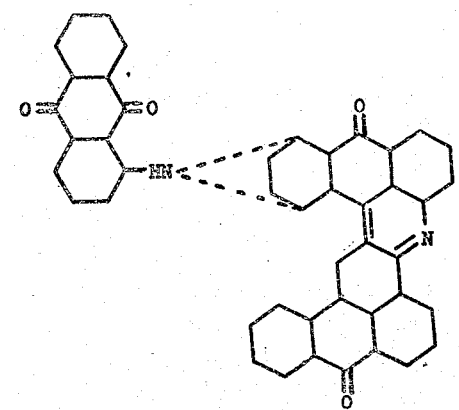

*Example 6*

To 180 parts of polyphosphoric acid at 110° C. is added 35 parts of 3,9-bis(anthraquinonylamino)benzanthrone while stirring. Polyphosphoric acid is marketed by the Victor Chemical Works, Chicago, Illinois, having a phosphoric anhydride equivalent of 82–84%. The mass is heated to 145–150° C., held at this temperature for 2.5 hours, and then cooled to about 70° C. The dye is precipitated by the addition of 390 parts of water to the stirred mass, and isolated by filtration and washing of the cake. The product thus obtained is similar to that prepared according to Example 1.

It is understood that the preceding representative examples may be varied with the disclosed equivalent reactants and operating conditions to give essentially the same results as will be fully comprehended by one skilled in the art on reading the instant specification in its entirety.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A vat dye of the formula

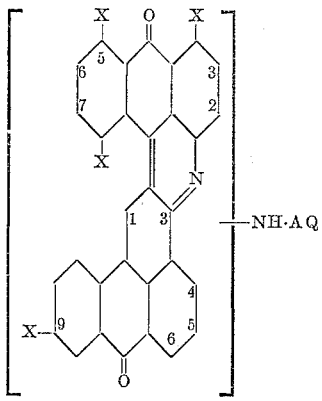

wherein the anthraquinonyl amino radical —NH·AQ is attached in one of said X-positions, said radical being selected from the group consisting of substituted and unsubstituted aminoanthraquine radicals, the substituents being selected from the group consisting of chloro-, bromo-, methyl-, methylamino-, cyclohexylamino-, p-toluidino- and benzacridone radicals, the remaining X's being hydrogen, and when said aminoanthraquinone radical is attached in said numbered position 9, 2 of said X's in numbered positions 4, 5 and 8 are hydrogen and the remaining X is selected from the group consisting of hydrogen and an imino radical which together with the ortho carbon 3, 6 and 7, respectively, forms part of a benzacridone ringed-appendage.

2. A vat dye of the formula

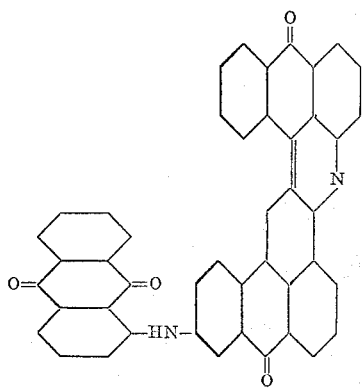

3. A vat dye of the formula

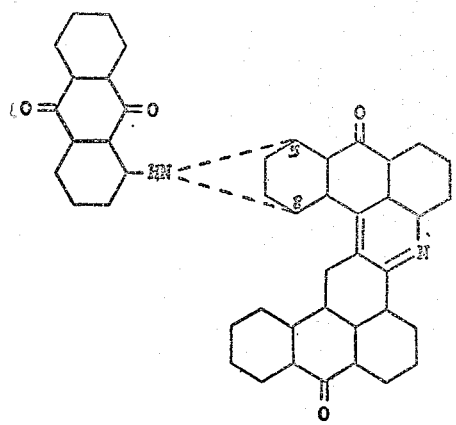

wherein the dotted lines represent a mixture of the indicated 5 and 8 isomers.

4. A vat dye of the formula

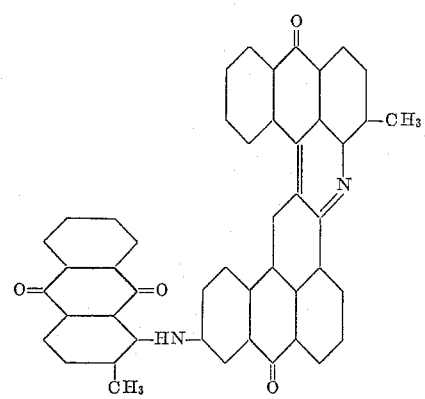

5. A process for preparing a ceramidonine vat dye which comprises heating a composition of the formula:

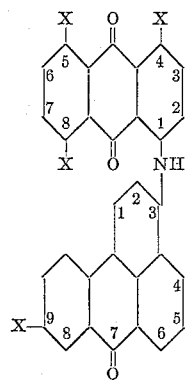

wherein attached in one of said X positions is a radical selected from the group consisting of substituted and unsubstituted anthraquinonyl amino radicals, —NH·AQ, the substituents being selected from the group consisting of chloro-, bromo-, methyl-, methylamino-, cyclohexylamino-, p-toluidino- and benzacridone radicals, the remaining X's being hydrogen, and when said anthraquinonyl amino radical is attached in said numbered position 9, 2 of said X's in numbered positions 4, 5 and 8 are hydrogen and the remaining X is selected from the group consisting of hydrogen and an imino radical which together with the ortho carbon 3, 6 and 7, respectively, forms part of a benzacridone ringed-appendage, in a dehydrating agent selected from the group consisting of concentrated sulfuric acid and polyphosphoric acid at a temperature within the range of 50 to 155° C. until the acridine ring-closure is completed.

6. A process according to claim 5 which comprises heating 1 part of 3,9-bis-(1-anthraquinonyl amino)benzanthrone in 10 parts of concentrated sulfuric acid until the acridine ring-closure is completed.

References Cited in the file of this patent
UNITED STATES PATENTS

| | | |
|---|---|---|
| 1,845,469 | Holff et al. | Feb. 16, 1932 |
| 2,014,568 | Hornold et al. | Sept. 17, 1935 |
| 2,505,234 | Deinet | Apr. 25, 1950 |
| 2,805,224 | Baumann et al. | Sept. 3, 1957 |

FOREIGN PATENTS

| | | |
|---|---|---|
| 743,509 | Great Britain | Jan. 18, 1956 |

OTHER REFERENCES

Sharvin et al.: Chem. Abstracts, volume 23, pages 2444–5 (1929).